Feb. 28, 1939. H. C. HOOK 2,148,557
AUTOMOBILE VANITY
Filed May 25, 1937
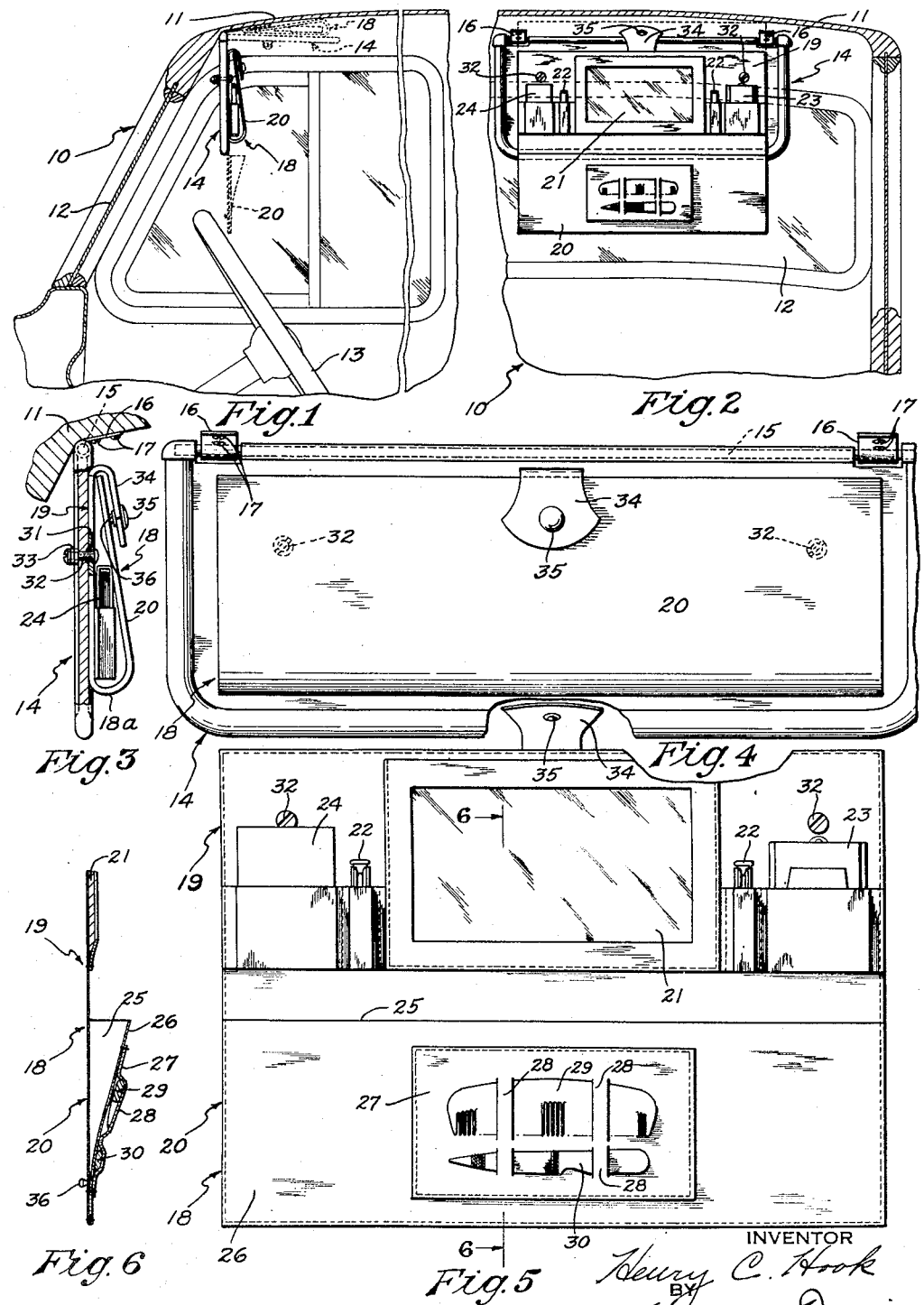
INVENTOR
Henry C. Hook
BY
Wooster & Davis
ATTORNEYS.

Patented Feb. 28, 1939

2,148,557

UNITED STATES PATENT OFFICE 2,148,557

AUTOMOBILE VANITY

Henry C. Hook, Bridgeport, Conn.

Application May 25, 1937, Serial No. 144,573

6 Claims. (Cl. 132—79)

This invention relates to new and useful improvements in vanities or make-up devices, and has particular relation to an automobile vanity.

An object of the invention is to provide a vanity particularly adapted to be attached to any or the usual automobile sun visor.

Another object is to provide an automobile vanity attached to one side of a sun visor whereby when neither the vanity nor the visor is in use both occupy an out of the way position, and whereby neither interferes with the use of the other, and whereby when the vanity is to be used it is conveniently supported in correct position for use.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a sectional view through the forward portion of an automobile showing the present automobile vanity attached to any or the usual sun visor of the automobile;

Fig. 2 is a somewhat similar view but is taken looking from the right of Fig. 1 and from the passenger's side of the front seat of the automobile, and showing the vanity open for use;

Fig. 3 is an edge view on an enlarged scale with parts of the visor and vanity broken away to show the manner of attaching the latter to the former;

Fig. 4 is a front elevational view showing the vanity attached to the visor and closed;

Fig. 5 is an elevational view looking into the open vanity; and

Fig. 6 is a sectional view taken substantially along the plane of the line 6—6 of Fig. 5.

Referring in detail to the drawing, at 10 is shown the forward portion of an automobile including a roof 11, windshield 12 and steering wheel 13 all as is well known in the art. Within the automobile and secured to the forward inner portion of the roof thereof or to the windshield frame is a sun visor 14. Such visor includes a horizontal bar 15 passing through brackets 16 secured in place as by screws or other fastening means 17. The bar 15 is turnable in the brackets so as to permit of the visor being located in a depending position as in Figures 1 through 3, wherein the visor is in operative position, or in an upper or out of the way position where the visor is against the inner side of the roof as shown by the dotted lines in Fig. 1.

The vanity of the invention includes a case 18, preferably of leather or the like, folded upon itself through its longitudinal center as indicated at 18a whereby to provide a rear panel 19 and a front panel 20. A mirror 21 is supported on the panel 19 and the latter also is provided with pockets receiving lipsticks 22, rouge compact 23 and cleansing tissue 24, although it will be understood that other cosmetics may be carried in the pockets.

On the inner side of the front panel 20 is a relatively large pocket 25 to receive large sheets of cleansing tissue or the like. To the inner wall 26 of pocket 25 a piece of leather or the like 27 is sewed and has straplike portions 28 lanced therefrom to hold a comb 29 and a nail file 30, although other articles may be secured in place by such straps.

At spaced points in the rear panel 19 eyelets 31 are arranged (see Fig. 3) and through such eyelets screws 32 are passed. Such screws are used to secure the rear panel 19 against a side of the sun visor 14, holes for the passage of the screws being punched through the visor. Leather or other washers 33 may be placed about the screws at the rear of the visor, and it will be clear that with the screws tightened the case 18 is secured in place. The eyelets 31 serve to prevent the screws tearing out of the case.

As here disclosed the visor is so mounted that when it is in depending position the side facing a passenger or anyone within the automobile is the same side that is against the roof when the visor is not in use. It is against such side of the visor that the case 18 is secured. Therefore when the visor is in its upper position the vanity is out of the way and substantially concealed. Also when the visor is in use, that is, in its depending position the vanity does not interfere with the functions of the visor as the case is closed as shown in Figs. 3 and 4.

When the vanity is to be used the visor is swung to depending position as in Figs. 1 through 3 and the front panel 20 is swung open and into a depending position with the mirror and toilet articles facing the passenger as shown in Figs. 2 and 5. After use the panel 20 is again swung or folded up to a position over the panel 19 whereby all the toilet facilities are covered. One or more straps 34 on the rear panel 19 carries one member 35 of a snap fastener to cooperate with the other member 36 of such fastener carried by the panel 20. The fastener members are so arranged that when panel 20 is over panel 19 the strap 34 and the snap fastener serve to releasably secure panel 20 in such position.

From the foregoing it will be clear that the present automobile vanity is arranged convenient for use, and that neither it nor the sun visor interfere one with the use of the other. When the vanity is not in use the various toilet articles are covered, concealed and out of the way, and the mirror 21 is so enclosed that in case of accident there will be no danger to the occupants of the automobile by reason of breakage of the mirror. All the necessary make-up materials being arranged as here shown there is no reason for a passenger to shift the usual rear view mirror out of its normal position to a position for use for toilet purposes. Thus this mirror is always in the position desired by the driver for the purpose of giving him a view to the rear, and he does not suddenly find this mirror has been shifted out of position just when he needs it most.

Having thus set forth the nature of my invention, what I claim is:

1. In an automobile vanity, a case comprising a pair of panels hingedly connected at their lower edges, a mirror supported by and exposed at the inner side of one of said panels, means for fastening the mirror supporting panel against the rear side of an automobile sun visor with the hingedly connected edges downwardly, the other of said panels being foldable over the mirror supporting panel in position covering the mirror thereon, and means releasably securing said other panel in such folded position.

2. In an automobile vanity, a case comprising a pair of panels hingedly connected at their lower edges, a mirror supported by one of said panels and exposed at the inner side thereof, means carried by said mirror supporting panel for fastening it against the rear side of an automobile sun visor with the connected edges downwardly, the other of said panels being foldable over the rear of the mirror supporting panel in position covering the mirror thereon, and means releasably securing the said other panel in such folded position.

3. In an automobile vanity, a case comprising a back foldable upon itself to provide rear and front panels, a mirror supported by one of said panels on the inner side thereof, toilet articles supported by one of said panels on the inner side thereof, means for securing the rear panel against the rear side of a sun visor, said front panel being foldable from a position depending from the lower edge of the rear panel to a position over the latter to cover the mirror and the toilet articles, and means on said panels to releasably secure the front panel in the last mentioned position.

4. In an automobile vanity, a case comprising a back foldable upon itself to provide rear and front panels, a mirror supported by one of said panels, toilet articles supported by one of said panels, means for securing said rear panel against the rear side of a sun visor, said front panel being foldable from a position depending from the lower edge of the rear panel to a position over such panel, and means on said panels to releasably secure the front panel in position over said rear panel.

5. An automobile vanity comprising an attachment to be applied as an assembly to the rear side of a sun visor and including a panel construction, a mirror and toilet article holders mounted on said panel construction, and means for mounting the assembly on the rear surface of a visor to be exposed for use when the visor is in depending position for use and enclosed between the visor and the car roof when the visor is folded up adjacent the car roof.

6. An automobile vanity comprising an attachment to be applied as a unit assembly to the rear side of a sun visor, said assembly including a pair of panels hingedly connected at their lower edges, a mirror carried by one of said panels at the inner side thereof, holders for toilet articles on the inner side of at least one of the panels, said panels being foldable together to enclose the mirror and said holders, and means for securing the assembly as a unit to the rear side of a sun visor to be exposed for use when the visor is in depending position and be located between the visor and the roof of the car when the visor is folded upwardly adjacent said roof.

HENRY C. HOOK.